J. HENDERSON, Jr.
Rotary Engines.

No. 212,140.    Patented Feb. 11, 1879.

Attest:
Frank C. Holmes
Wm. W. Bonnett

Inventor:
John Henderson, Jr.
per Chas. G. Page,
atty.

UNITED STATES PATENT OFFICE.

JOHN HENDERSON, JR., OF WATERBURY, CONNECTICUT.

IMPROVEMENT IN ROTARY ENGINES.

Specification forming part of Letters Patent No. 212,140, dated February 11, 1879; application filed October 23, 1878.

*To all whom it may concern:*

Be it known that I, JOHN HENDERSON, Jr., of Waterbury, in the county of New Haven and State of Connecticut, have invented a new and useful Improvement in Rotary Engines and Pumps, which improvement is fully set forth in the following specification and accompanying drawings, in which—

Figure 1:
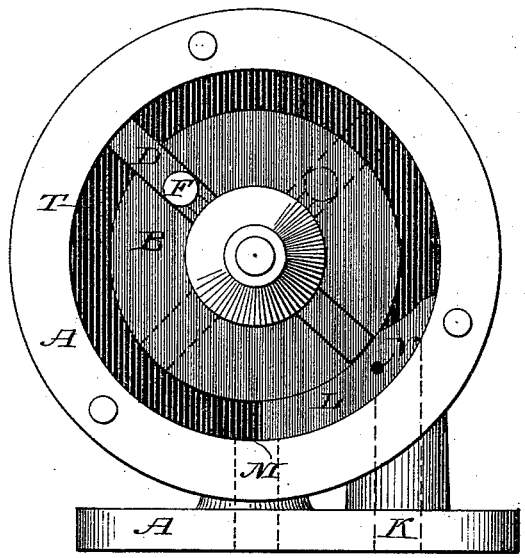
Figure 2:
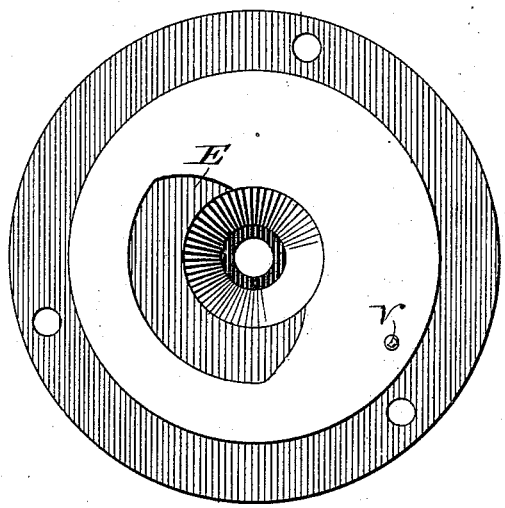
Figure 3:
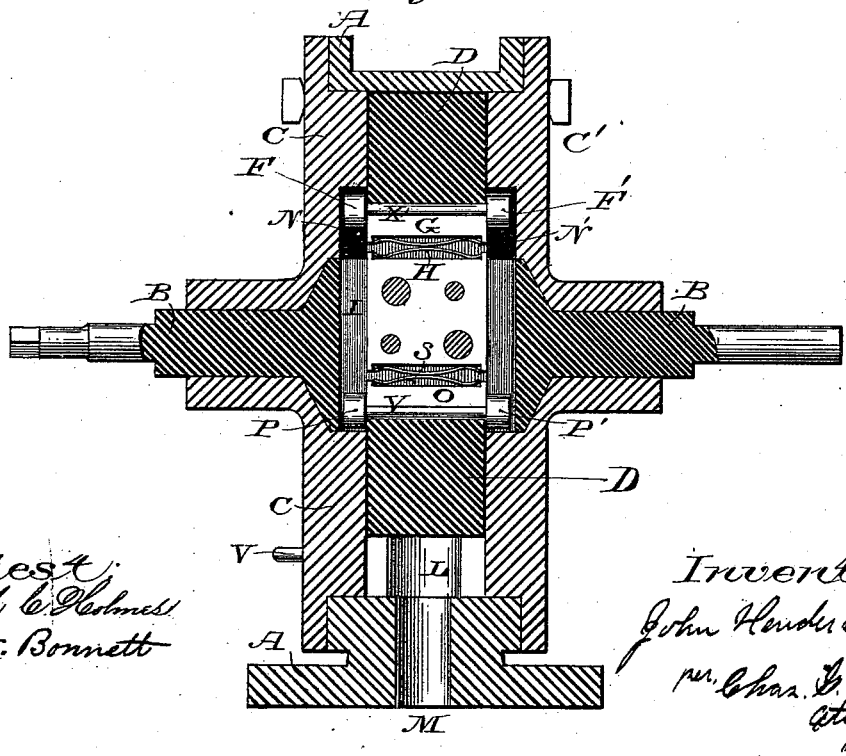

Figure 1 is a side view of the engine with head removed. Fig. 2 is a plan view, showing the inside of one head and form of cam. Fig. 3 is a section of the whole engine.

The object of my invention is to furnish a mechanism which, being placed inside the cylinder of a rotary engine or pump, will utilize the motive power of steam or water most economically, make a tight-working engine, and render the motive power more continuous and uninterrupted in its action, thus increasing the working power of steam.

In the drawings, A is the cylinder. B is the revolving piston inside the cylinder. The revolving piston revolves on bearings in the heads of the cylinder. C and C' are the heads. D is the sliding piston-wing, which rests in a slot in the revolving piston B. F and F' are rollers connected by a spindle, X. G is a shoe-piece, and H represents two springs resting in a space in the sliding piston-wing, and so shaped that they cannot be pushed out.

The spindle X, shoe G, and springs H rest in a mortise in the sliding piston-wing D. The rollers F and F' project beyond the sliding piston-wing D into the spaces N and N'.

In Fig. 3 the rollers F and F' are in the larger concentric parts of their respective cams. P and P' are rollers connected by the spindle Y. O is a shoe-piece. S represents two springs resting in a space in the sliding piston-wing, and so shaped that they cannot be pushed out.

The spindle Y, shoe O, and springs S rest in a mortise in the sliding piston-wing D. The rollers P and P' in Fig. 3 project beyond the sliding piston-wing and work in cams on each side. The shape of the cams is shown in Fig. 2 by the recess E. As the inner piston revolves the rollers F and F' will be brought into the same position and made to act on the cams.

I and I' are spaces in the piston B to admit the drawing back of the rollers when they act on the smaller concentric part of the cams. The cams are in the heads of the cylinder, one in each head. In Fig. 1, T is the space between the cylinder A and the revolving piston B. L is the abutment connected with the head C by the pin V. K is the inlet for steam or water, which extends through the cylinder A and abutment L into the space T. M is the outlet.

It will be seen from the foregoing that when the steam enters through the inlet K it causes the inner piston, B, to revolve by its pressure on the sliding piston-wing D. As the sliding piston-wing D thus revolves, the rollers F and F', which have been in the larger concentric parts of their respective cams, and consequently not touching the cams, will be brought into contact with the smaller concentric parts of the cams, and will cause the sliding piston-wing to move up, bringing the other end of the sliding piston-wing into contact with the inner surface of the cylinder; and this is possible, because the sliding piston-wing will have passed the abutment L, and the other rollers, P and P', will have left the smaller concentric parts of their respective cams and entered the larger concentric parts, where they are not in contact with the cams. The position of the sliding piston-wing will then be as represented by the dotted lines in Fig. 1. In Fig. 3 the rollers P and P' are in contact with the smaller concentric parts of their respective cams, while the rollers F and F' move freely in the larger concentric parts of their cams, which they do not touch.

The object of the springs H and S and shoe-pieces G and O is to maintain close and constant contact of the sliding piston-wing with the inner surface of the cylinder. As the rollers approach the smaller concentric parts of the cams the pressure of the spring increases, and as they leave it the pressure diminishes, the form of the cam being such as to admit of the expansion of the springs that are for the time being out of action without causing resistance to those that are in action.

The cams secure the constant reciprocity of the sliding piston-wing. Any number of single-ended short sliding piston-wings can be used in this machine with the same form of cam, or with any form of cam; but the cam would have to be grooved, for the rollers when acting would bear at one place on the inside of the groove, and at another place on the outside of the groove. When a double-ended sliding piston-wing is used, only the outer side of the groove is needed, for when the roller bears upon it it keeps the working end of the sliding piston-wing in contact with the inner surface of the cylinder, and at the same time keeps the other end clear of the abutment, as shown in Fig. 1.

By using one double-ended sliding piston-wing, the effect of centrifugal force, which is considerable on single-ended sliding piston-wings, is counteracted. Another advantage is that by using both ends of one long sliding piston-wing rather than three or more short single-ended sliding piston-wings the propelling current is less frequently interrupted, more time is given, and more space through which the current may act unbroken. It therefore admits of the use of the steam cut-off, and also the condenser.

The rollers, spindles, shoes, and springs can be applied with advantage to all pumps and engines of the rotary class whose sliding piston-wings are actuated by pins working in grooves.

The rollers, spindles, shoes, and springs may be combined with any form of cam. The form of cam which I have adopted is, however, the only one suitable for operating the long double-ended sliding piston-wing.

The above-described invention admits of the expansive use of steam by the application of ordinary valves. The elasticity secured by the use of the springs is an advantage which it has over all other engines of its class.

Having thus described my invention, what I claim as new, and desire to secure by Letters Patent, is—

1. In a rotary engine, the combination of the sliding piston-wing D, the rollers F and F', spindle X, connecting the rollers, shoe G, and springs H, substantially as shown and described.

2. In a rotary engine, the combination of the cylinder A, revolving piston B, and sliding piston-wing D, having the rollers F P F' P', spindles X Y, connecting the rollers, shoes G O, and springs H S, as and for the purpose described.

JOHN HENDERSON, Jr.

Witnesses:
 DUNCAN McARTHUR,
 LEWIS BEARDSLY.